Patented Aug. 25, 1931

1,820,655

UNITED STATES PATENT OFFICE

HELLMUT FISCHER, OF BERLIN-FRIEDENAU, GERMANY, ASSIGNOR, BY MESNE ASSIGN-
MENTS, TO METAL & THERMIT CORPORATION, OF NEW YORK, N. Y., A CORPORATION
OF NEW JERSEY

PROCESS OF OBTAINING BERYLLIUM COMPOUNDS FROM BERYLLIUM-BEARING
MINERALS

No Drawing. Application filed December 13, 1928, Serial No. 325,927, and in Germany December 15, 1927.

My invention relates to the treatment of minerals containing beryllium, for the purpose of obtaining therefrom beryllium compounds, and particularly beryllium salts. The treatment of such minerals or ores has offered considerable practical difficulties which are due mostly to the fact that only a relatively small percentage of beryllium is contained in such minerals. For instance, beryl (a silicate of beryllium and aluminium) which is a mineral of rather frequent occurrence, contains a very large amount of gangue consisting chiefly of silica, alumina, and iron, the gangue amounting up to 90% of the mineral. Heretofore, so far as I know, there was no satisfactory process for the industrial treatment of such beryllium-bearing minerals. The so-called wet process, according to which the mineral after comminution was treated with an acid, produced but a relatively small yield of beryllium, whereas the so-called dry processes, which as a rule involve melting the beryllium-bearing mineral together with oxides or carbonates of alkali metals, were objectionable on account of the high temperatures employed and of the resulting strain and wear of the material of which the crucible was made. Another objection to the dry process is found in the difficulty of comminuting the material under treatment.

My present invention relates to a process by which I am enabled to obtain a good yield of beryllium compounds from beryllium-bearing minerals, while avoiding the drawbacks of the processes employed hitherto.

For this purpose I first comminute a beryllium-bearing mineral and then heat it in the presence of an excess of alkali metal carbonate to temperatures which are relatively high, but still below the melting point of the mixture. The result of this heating, which is preferably continued for several hours, is a sintered mass, especial care being taken to avoid any melting of the mixture. The pulverulent mixture contracts during sintering, and, in contradistinction to what occurs in the previously employed dry processes, can be removed readily from the crucible. The material of which the crucible is made, is practically not attacked at all. My process enables me to obtain from the minerals up to about 90% of the theoretical content of beryllium. It is highly important however, that an excess of alkali carbonate should be employed.

The coherent mass resulting from the sintering action is then comminuted, which can be effected without any practical difficulty, and is then subjected to further treatment. An advantageous method consists in treating the mass, after it has been comminuted, with the solution of a hydrogen halide, for instance hydrochloric acid, whereby a thick paste is obtained. The latter is added to a solution of sodium bicarbonate. I am thus enabled to accomplish a practically complete separation of the beryllium salt from the entire gangue portion in a single operation, since the sodium bicarbonate solution will dissolve only beryllium, whereas the other constituents remain undissolved. The separation of the solution from the undissolved residue may be effected in any suitable manner, for instance by decanting.

An important feature of this operation is the simultaneous separation of the beryllium salt from the silica and the other foreign metal compounds. The berryllium salt obtained from the alkali metal bicarbonate solution according to any well-known or approved process, may then be subjected to any suitable further treatment for the purpose of obtaining other beryllium salts therefrom.

Occasionally it will be found that beryllium salts obtained according to the process above set forth contain a slight proportion of iron, which may come either from the original mineral or from impurities of the chemical reagents employed. If it be desired to remove such traces of iron from the beryllium salts, I may take advantage of the hitherto unknown fact that the addition of a small amount of ammonium sulphide to a solution which contains a relatively large amount of beryllium and a relatively small amount of iron, will first precipitate the iron in the form of sulphide and only subsequently precipitate the beryllium in the form of hydroxide. In such cases therefore, the beryllium salt contaminated by iron is dissolved and to the solution I add a small amount of ammonium sulphide, about as much as corresponds to the amount of iron present. This will cause a practically quantitative percipitation of iron in the form of sulphide, so that subsequent separation of the liquid from the precipitate (say, by filtration) will yield beryllium salts practically free from iron. It is preferable to heat the solution after filtration to a relatively high temperature, or better still, to concentrate it by evaporation, in order to drive off any remaining traces of ammonium sulphide.

To give an example I may proceed as follows: Beryl mineral such as is found in nature, is powdered very finely and then mixed with sodium carbonate in the proportion of about one part (by weight) of beryl to two parts of sodium carbonate. The mixture is heated in a refractory crucible for about two or three hours to a temperature of approximately 700° C., care being taken to avoid fusion of the mass. This heating transforms the powdered material into a sintered coherent mass which can be removed readily from the crucible. Such mass after its removal is comminuted in any suitable manner and by the addition of hydrochloric acid, it is converted into a paste which is added to a solution of sodium bicarbonate. For instance, if the raw material consisted of 10 kilograms of beryl, the thick paste obtained by the addition of hydrochloric acid may be added to about 140 liters of a 15 per cent. solution of sodium bicarbonate. It is desirable to heat this solution to about 50° C. Such treatment will cause the aluminium compounds, the iron compounds, and silica to remain almost entirely undissolved, whereas beryllium is dissolved and may be separated from the residue readily, for instance by filtration. From this beryllium solution the particular salts which it is desired to produce, may be obtained in any well-known or approved manner; for instance the addition of hydrofluoric acid will produce beryllium fluoride.

In the event that the beryllium salts should still contain iron, the latter may be removed in the following manner: If, for instance, the process described above yields 10 kilograms of beryllium fluoride with an iron content of about .2 per cent., such fluoride is dissolved in a small quantity of water say about from 10 to 15 liters. To this beryllium fluoride solution I then add about 400 cubic centimeters of a 10 per cent. solution of ammonium sulphide under continual stirring, at ordinary room temperature. This treatment will produce a precipitate consisting exclusively of iron sulphide. The solution is then preferably allowed to stand for several hours, in order to give the iron sulphide an opportunity to collect or settle at the bottom of the receptacle. The supernatant, practically iron-free solution can be separated from the precipitate in any suitable manner, for instance by decantation. The solution is then concentrated by evaporation, which causes any remaining traces of ammonium sulphide to become volatilized, and the resulting product is a beryllium fluoride free from iron. This product may be utilized in various ways, for instance it may be employed with great advantage as the major constituent of the molten mass intended for the production of compact metallic beryllium by electrolysis of a molten bath.

While I have referred to the removal of small amounts of iron from beryllium salts obtained in the specific manner described above, I desire it to be understood that the above described steps for removing iron from beryllium salts may be used in connection with beryllium salts obtained by any other process.

I claim:

1. The process of obtaining beryllium compounds from beryllium-bearing minerals, which comprises comminuting a beryllium-bearing mineral, adding thereto pulverulent alkali metal carbonate used in excess, heating both of said substances together to a relatively high temperature, but below their melting points, for a length of time sufficient to convert said substances into a sintered mass, comminuting said mass, and subjecting it to further treatment for the production of beryllium compounds.

2. The process of obtaining beryllium compounds from beryllium-bearing minerals, which comprises mixing a finely comminuted beryllium mineral with alkali metal carbonate used in excess, heating the mixture to a relatively high temperature, but below the melting point of such mixture, for a length of time sufficient to convert said mixture into a sintered mass, comminuting such mass, adding thereto a solution of a hydrogen halide to form a paste, adding such paste to a solution of an alkali metal carbonate, and separating the resulting solution of beryllium compounds from the undissolved constituents.

3. The process of obtaining beryllium compounds from beryllium-bearing minerals, which comprises sintering a pulverulent beryllium-bearing mineral together with sodium carbonate used in excess, comminuting the sintered mass, adding hydrochloric acid thereto to form a paste, mixing such paste with a solution of sodium bicarbonate, heating the mixture to about 50° centigrade, and separating the resulting solution of beryllium compounds from the undissolved residue.

4. The process of obtaining beryllium compounds from beryllium-bearing minerals, which comprises sintering a pulverulent beryllium-bearing mineral admixed with sodium carbonate in excess, treating the sintered mass with hydrochloric acid to form a paste, adding said paste to a sodium bicarbonate solution, separating the clear solution from the precipitate, adding hydrofluoric acid to the solution to form beryllium fluoride, treating beryllium fluoride in solution with about the quantity of ammonium sulphide to precipitate any iron present, removing the precipitate and separating the so purified beryllium fluoride from the solution.

In testimony whereof I affix my signature.

HELLMUT FISCHER.